July 26, 1966  J. TUIT  3,262,577
LEAF FILTER MEDIA CLAMPING MEANS
Filed May 14, 1964
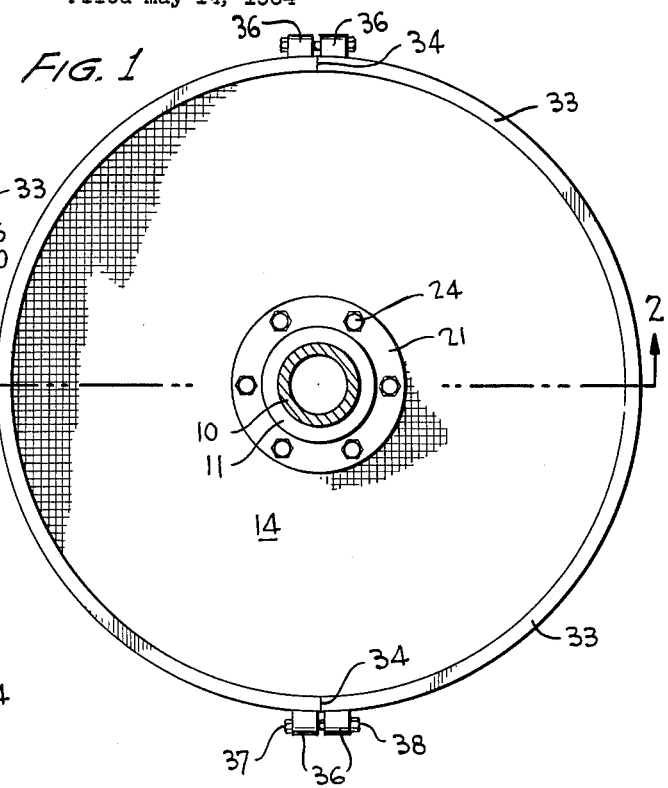
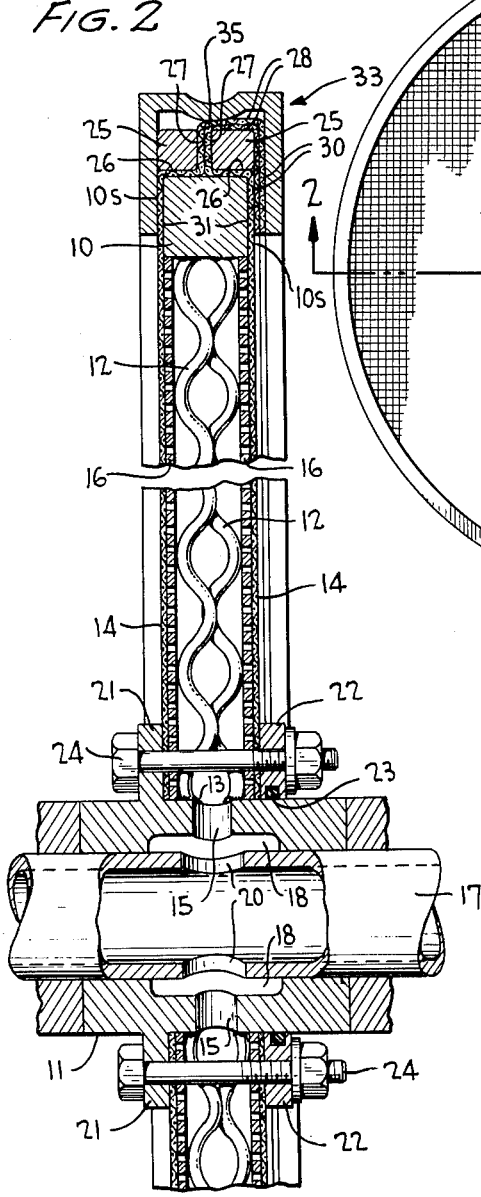
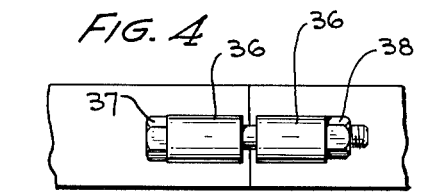
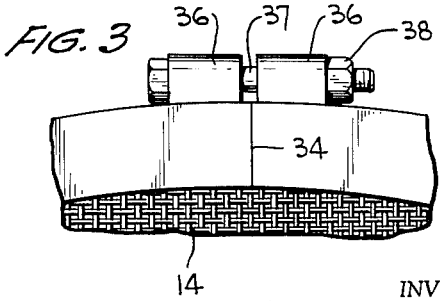
INVENTOR,
JOHN TUIT
BY Watson, Cole, Grindle & Watson
ATTORNEYS

United States Patent Office 3,262,577
Patented July 26, 1966

3,262,577
LEAF FILTER MEDIA CLAMPING MEANS
John Tuit, Oakland, N.J., assignor to Komline-Sanderson Engineering Corp., Peapack, N.J., a corporation of New Jersey
Filed May 14, 1964, Ser. No. 367,415
10 Claims. (Cl. 210—487)

This invention relates to an improved filter leaf construction and more particularly to improvements in the means for replaceably securing the outer peripheries of flexible filter media in sealed relation at the outer periphery or rim of the filter leaf.

Customarily, a plurality of filter leaves are supported within a vessel in communication with a common manifold which removes the filtrate from the hollow interiors of the respective leaves. The filtrate flows into the said leaves as a result of differences in pressure on the outside and interior of the respective leaves. Each leaf is conventionally constructed to comprise a rigid frame, on opposite sides of which are supported relatively spaced filter media, the said media being maintained in their spaced relation generally by a suitable drainage grid structure, augmented if desired by suitable perforated supporting plates, while arranged to permit flow of filtrate through the relatively spaced filter media and into the drainage space provided therebetween, and thence to the said manifold with which each of the hollow leaf interiors communicates.

Since the filter media on each filter leaf are generally required to be replaced from time to time, it has long been desirable to so associate the said media with the rest of the filter leaf structure in a manner to facilitate its replacement in a minimum amount of time in the field, by the use of normally available hand tools. Where the filter media is comprised of flexible fabric, such as woven textile fabric, considerable difficulty has been encountered in connecting the outer marginal edges of the respective filter cloths or media to the outer periphery or rim of the leaf in a manner which will permit drawing and maintaining the fabric filter media taut over the supporting leaf structure, while also maintaining it completely sealed to the rim, without the necessity for employment of caulking or sewing for providing a proper seal. Even where caulking has been resorted to in the past it has still been difficult to draw the fabric tight in initially applying it. Moreover during operation of the filter, the weight of the filter cake and expansion of the leaf structure due to heat tends to pull the cloth from under the caulking, thereby disrupting the seal to allow unfiltered liquid to pass through the leaf, with resulting product contamination.

While sewing will eliminate the foregoing problems, this necessitates the use of a special sewing machine and thereby renders it generally impractical to replace the filter media in the field.

With these considerations in mind, it is the primary object of the present invention to provide a filter leaf construction in which the flexible fabric filtering media may be readily replaced in the field by the use of common hand tools, while being drawn taut as an incident to its replacement, and in which the outer marginal edges of the respective filter media will be firmly and reliably maintained in their interconnected and sealed relation to the filter rim.

In accordance with the present invention, the outer edge portions of the opposed filter media are firmly interconnected and sealed to the leaf rim by the use of mechanically applied clamping forces, and without the necessity for sewing or caulking. Moreover the arrangement is such that the assembly of the various rim parts to apply the desired clamping forces on the filter media serves inherently to draw the filter media uniformly taut over the filter frame.

A primary feature of the invention consists in the utilization of relatively opposed clamping rims which encircle the rigid leaf rim and are applied thereto from opposite sides in such manner that a marginal edge portion or zone of each of the opposed filter media is clamped between one of said clamp rims and the outer periphery of the leaf rim, while other marginal zones or portions extend outwardly between the clamp rims in parallel relationship, the rims being firmly urged toward each other to clamp said portions of the filter media between them, by reception of said clamp in the channel of the channel rim member.

Moreover, in accordance with a further feature of the invention, a further portion or zone of each filter media which projects outwardly from between the clamping rims is folded over across the outer face of one of them and clamped thereagainst by the bottom of the channeled clamping rim. Still further clamping and holding action is achieved, if desired, by folding still further outer marginal portions or zones of the filter media back inwardly for clamping between a sidewall of the channel and one of the relatively remotely presented side faces of a clamp rim, as well as between said channel side face and the opposed face of the leaf rim.

In such a structure, the channeled outer rim not only produces the clamping action between the said clamp rims and serves itself also as a clamping means, but in addition functions to maintain the clamp rims assembled to the leaf rim.

The foregoing, as well as other features and advantages of the invention, will be apparent from the following detailed description of a preferred embodiment of the invention, taken in conjunction with the accompanying drawings, in which:

FIGURE 1 is a front elevation of a filter leaf embodying the invention.

FIGURE 2 is an enlarged fragmentary section on the line 2—2 of FIGURE 1.

FIGURE 3 is an enlarged fragmentary front elevation showing a portion of the leaf structure including the clamping means for drawing adjoining ends of the channeled rim toward each other, to thus urge them inwardly over the leaf rim and clamping rims; and FIGURE 4 is a similarly enlarged top plan view of the portion of the leaf structure shown in FIGURE 3.

In the accompanying drawings there is shown a specific embodiment of the invention and specific language will be hereinafter employed to refer to the various parts of the invention. However, it is to be understood that the accompanying drawings and such descriptive language as is hereinafter used in connection herewith, will be merely by way of exemplification, and is not intended to limit the invention to the specific form shown, it being contemplated that various modifications and alterations of an obvious nature may be made without departing from the invention.

Referring now in detail to the accompanying drawings, the filter leaf shown in FIGURE 1 is of circular configuration though of course it is not limited to this particular configuration and may be of other shapes as will be apparent.

Referring jointly to FIGURES 1 and 2 the leaf structure comprises a generally rigid frame including the leaf rim 10 which is supported from a central hub 11 primarily by a rigid drainage grid 12. The outer periphery of grid 12 is secured, as by welding, to the inner peripherally presented face of the leaf rim 10. Similarly the inner periphery of the metal drainage grid 12 is slidably disposed as at 13 on the metal hub structure 11. The drainage grid is of any conventional structure adapted to maintain the opposed filter media 14—14 in spaced relation on its opposite sides and to permit drainage of liquid filtrates through the hollow interior of the filter leaf for discharge through a drainage port 15 in the hub 11. The action of the drainage grid 12 in spacing apart the opposed filter media 14—14 is preferably augmented by the use of perforated rigid support plates 16 underlying the filter media on opposite sides of the drainage grid 12 so that the cloth or other flexible fabric filter media will not be caused to stretch and sag inwardly under pressure. The supporting plates 16 are preferably of suitable metal with their outer peripheries respectively welded or otherwise fixedly secured to the leaf rim 10, and their inner peripheries slidably disposed on the hub 11. The slidable disposition of the leaf parts 12 and 16 on the hub permits axial removal of the leaf from the hub for the purpose of replacing the filter media 14—14.

The structure of the hub 11 may be of a conventional nature, the hub being disposed together with the axially adjoining hubs of similar filter leaves, on a manifold 17 in the form of a pipe which preferably serves the dual functions of supporting the several filter leaves as well as removing the the filtrate from each. Thus the discharge port 15 of each filter leaf opens into an annular chamber 18 which, in turn, communicates through one or more drainage openings 20 with the interior of the tubular manifold 17.

For clamping the respective filter media 14—14 in sealed relation about the hub, the hub is provided with conventional annular clamping flanges 21 and 22, of which the flange 21 is fixed to the hub, while the flange 22 is axially movable thereon. The movable flange 22 encircles the cylindrical external face of the hub 11 and is in sealing relation therewith due to the provision of suitable sealing means such as the O-ring seal 23. Suitable clamping bolts 24 are arranged to draw the clamping flange or ring 22 axially toward the flange 21 whereby to clamp the inner margins of the respective filter media 14—14 against the media supports or plates 16.

The improvements of the present invention are incorporated in the arrangement of the outer leaf rim 10, in combination with the several associated clamping means for drawing the filter media tight and for securing the outer peripheral or marginal portions thereof in sealed relation.

Thus referring to FIGURE 2, each filter media 14—14 extends outwardly from the hub and over and beyond one of the relatively oppositely presented side faces 10S of the leaf rim 10. Peripheral clamp rims or rings 25—25 are then urged inwardly toward each other from opposite sides of the leaf rim 10 to fold a first marginal portion or zone 26 of each filter media between the inner and outer peripheries respectively of said clamp rims 25—25 and the leaf rim, and to clamp together in flush relationship, second zones or portions 27—27 of the respective filter media. The clearance between the inner and outer peripheries of the clamping rims 25 and the leaf rim 26 respectively is so chosen relative to the thickness of the filter media 14 that the filter media is compressed and radially confined or clamped between such peripheries. It will be apparent that as the clamping rims 25 are urged onto the leaf rim 10 over the interposed filter media, the resulting frictional engagement and movement of the rings with the filter media will tend to draw the filter media outwardly in all directions from the hub 11, thus to draw such media uniformly tight over the surfaces of the media supports 16.

After the rings or clamp rims 25 are thus applied over the leaf rim 10 and brought toward each other into engagement with the interposed zones 27 of filter media, the portions of such media which project outwardly from between the rings are then each folded over the outer peripheral face of one of the clamp rims 25 in the manner exemplified by the zones or portions 28 respectively of said media in FIGURE 2. While such zones 28 could, if desired, be folded in opposite directions across the outer peripheries of the respective rims 25, it has been found that a superior clamping hold is obtainable when they are folded together in flush parallel relationship in accordance with the preferred manner of carrying out the invention.

Preferably the parallel and coextensive terminal or peripheral edge portions which comprise fourth portions or zones 30 of the respective media are then folded to extend back reversely inwardly over the outwardly presented side of one of the clamp rims 25, preferably being of sufficient length to extend also over and parallel to the sidewall or face of leaf rim 10 in parallel and contiguous relation to the relatively inwardly located zone 31 of the filter media which directly engages the leaf rim 10.

The several parts are urged and maintained in clamping relation with each other and with the interposed portions of the filter media, and also are maintained in assembled relation with each other, by a clamping rim 33 which encircles the assembled leaf rim 10 and clamp rims 25. Clamping rim 33 is formed to define a downwardly or inwardly presented channel for reception of the rims 10 and 25 and their associated portions of the filter media. The width of the channel is such that it snugly receives rims 10 and 25 and their associated media portions and thus urges and maintains the clamping rims 25 in firm clamping engagement with the interposed zones 27 of the filter media. At the same time, the fourth zone 30 of the filter material or media which is interposed between a side of the channel and the opposed side faces of the leaf rim 10 and one of the clamping rims 25 is firmly compressed and clamped between such channel side and side faces. The zones or portions of filter media 31 are similarly clamped and held.

It will be apparent that the successive zones or portions 31, 26, 27, 28 and 30 of the filter media are each positively engaged and held by clamping forces which are applied successively and alternately at right angles to each other.

The cumulative force of these several clamping actions is very substantial and will normally be increased by the tendency of the fabric filter media to expand when it becomes moistioned in use, as well as by the necessity to pull the material around corners to loosen it.

In order to further increase the holding power of the apparatus, and also in order to permit ready assembly and disassembly of the various parts, the channel rim 33 is interrupted at one or more locations around its circumference or periphery, as at 34—34. The abutting ends of the channeled rim 33 at each such interruption are releasably interconnected by means which enable them to be drawn inwardly over the assembled rims 10 and 25 with a substantial degree of force sufficient to further supplement the clamping action by urging the bottom of the channel into firm clamping engagement with the third zones or portions 28 of the filter media whereby to clamp or compress these portions between the channel bottom and one of the rims 25. It will be noted that in the preferred embodiment, the channel bottom is formed to present a ridge 35 coextensive with the channel for substantial line engagement with the third zone 28 of filter media substantially at the location of its bend around the corner of the clamping rim 25, or in other words substantially at the angular juncture of zones 27 and 28. Such arrangement has been found to give improved holding power.

The means shown for drawing the ends of the channel rim 33 together at the interruptions 34 may be generally conventional, being exemplified in FIGURES 4 and 5 by upstanding lugs 36—36 affixed to the rim 33 on opposite sides of each break or interruption 34 to be drawn together by actuation in obvious manner of the conventional clamping bolts 37 and nuts 38.

Whenever it becomes necessary to replace the filter media 14—14, this may be readily accomplished by loosening the clamping bolts and nuts 37 and 38 to permit outward displacement and removal of the channel rim 33. The rims 25 may then be disassembled in obvious manner from the leaf rim 10 to free the outer marginal zones or portions of the respective filter media. The inner peripheries thereof may be released simply by release and removal of the clamping flanges 22 and bolts 24 respectively and axial removal of the leaf from its sub 11. New media may be reapplied then over the opposite faces of the filter leaf, and the several parts reassembled in the manner earlier described. It will be readily apparent that the improved outer rim structure of the invention, with its efficient clamping and tightening action, may be quickly and readily removed and reapplied together with new filter media with a minimum of difficulty and with the use of readily aviailable hand tools.

Further, it will be apparent that, by virtue of the extremely efficient clamping action employed, the filter media will be firmly sealed at its outer periphery and held tight over a long period of use.

Having thus described my invention, I claim:

1. In a filter leaf wherein a pair of flexible fabric filter media are maintained in spaced relation on opposite sides of a rigid leaf frame having a rigid marginal leaf rim with the outer marginal portions of said media secured to the rigid marginal leaf rim of said leaf frame, the improvement in accordance with which said rim is provided with substantially flat side faces and an outer peripheral surface extending between said faces, a pair of parallel clamp rims encircling said leaf rim, the outer marginal edge portions of said filter media extending outwardly across the respective said side faces of the leaf rim, thence inwardly between the said outer peripheral surface of the leaf rim and the inner peripheries of the respective clamp rims, then outwardly between said clamp rims, said clamp rims being proportioned to clamp said media firmly against said leaf rim, and means for maintaining said clamp rims in clamping engagement with the filter media portions extending outwardly between them, said last-mentioned means comprising a channeled outer rim encircling said clamp rims and having an inwardly-directed channel snugly receiving said clamp rims and said leaf rim and maintaining all of said rims in their assembled relation.

2. In a filter leaf wherein a pair of flexible fabric filter media are maintained in spaced relation on opposite sides of a rigid leaf frame having a rigid marginal leaf rim, with the outer marginal portions of said media secured to the rigid marginal rim of said leaf frame, the improvement in accordance with which said leaf rim is provided with substantially flat side faces and an outer peripheral surface extending between said side faces, a pair of parallel endless clamp rims encircling said leaf rim, the outer marginal portions of said media extending outwardly across the respective side faces of the leaf rim thence inwardly between its said outer peripheral surface and the inner peripheries of the respective clamp rims, then outwardly between said clamp rims, said clamp rims being proportioned to clamp said media firmly against said leaf rim, a channeled outer rim encircling said clamp rims and leaf rim and having an inwardly directed channel snugly receiving said clamp rims and leaf rim, said channeled rim defining an inwardly directed channel proportioned to maintain said clamp rims in firm clamping engagement with the filter media portions extending outwardly between them, said channeled outer rim further maintaining all of said rims in their assembled relation, other marginal portions of said filter media further projecting outwardly from between said clamp rims and each overlying the outer periphery of a said clamp rim, means being provided in association with said outer channeled rim for drawing same inwardly toward said clamp rims to clamp said further marginal portions of the filter media between the outer periphery of said clamp rim and the bottom of the channel in said channeled rim.

3. In a filter leaf as defined in claim 2, the further improvement in accordance with which both said further marginal portions of the filter media which overlie the outer periphery of a clamp rim are disposed in contiguous parallel relation over the outer periphery of the same clamp rim.

4. A filter leaf as defined in claim 3, in which said channel bottom is formed with a ridge coextensive in length with the channel for line engagement with said filter media.

5. A filter leaf as defined in claim 2, in which both said further portions of the filter media which overlie the outer periphery of a clamp rim are disposed in contiguous parallel relation over the outer periphery of the same said clamp rim, and thence extend inwardly in a clamped relation between an outer side face of said same clamp rim and a sidewall of the channel of said channeled rim.

6. A filter leaf as defined in claim 2, in which both said further portions of the filter media which overlie the outer periphery of a clamp rim are disposed in contiguous parallel relation over the outer periphery of the same said clamp rim, and thence extend inwardly in clamped relation between an outer side face of said same clamp rim and a sidewall of the channel in said channeled rim and also in clamping relation between said channel sidewall and the outer side face of said leaf rim.

7. A filter leaf as defined in claim 2, in which said channeled rim is interrupted with relatively adjoining ends on opposite sides of the interruption, said means for drawing the channeled rim inwardly toward said clamp rims releasably interconnecting said adjoining ends and being operative to urge them toward each other.

8. A filter leaf as defined in claim 7, in which said last mentioned means comprises threaded means interconnecting said adjoining ends and operative to draw them toward each other.

9. A filter leaf as defined in claim 2, in which all of said rims are of circular configuration.

10. In a filter leaf having a rigid marginal leaf rim wherein a pair of relatively opposed flexible fabric filter media are maintained in spaced relation on opposite sides of a drainage grid within said rim, and their outer marginal edge portions are secured to said rigid marginal leaf rim of said filter leaf, the improvement in accordance with which said leaf rim has an outwardly directed peripheral surface generally normal to the plane of said filter leaf, and relatively spaced side faces generally parallel to the plane of the filter leaf, a pair of parallel endless clamp rims encircling said leaf rim, said filter media respectively extending outwardly across the respective side faces of the leaf rim and having first marginal zones extending inwardly from said side faces and clamped between said leaf rim and the respective clamp rims, second marginal zones of said respective media extending outwardly between said clamp rims, third zones of each said filter media outwardly of said second zones extending over and flush against the outer periphery of one of said clamp rims, a fourth marginal zone of each said filter media outwardly of said third zone being reversely directed back inwardly over the outwardly presented side of said one clamp rim and the corresponding side face of said leaf rim, a channeled outer rim encircling said leaf rim and said clamp rims, the channel of said outer rim being inwardly directed and proportioned to snugly receive and urge said clamp rims toward each other into tight clamping engagement with said second marginal zones of the filter media, said channel also receiving said leaf rim to maintain all of said rims in assembled relation, and means on said channeled rim for drawing same inwardly toward the outer peripheries of said clamp rims to bring the bottom of said channel into firm clamping engagement with said third zones of the filter media, said channel bottom being formed with a ridge coextensive in length therewith for line engagement with said third zone of the filter media, the said fourth zones of the filter media being firmly clamped between the side of said channel and one of the outwardly presented side faces of said clamp rims, said fourth zones of the filter media together with the said filter media which extends outwardly across the adjoining side face of the leaf rim, also being clamped between said side face of the leaf rim and said channel side.

References Cited by the Examiner

UNITED STATES PATENTS

| 1,323,421 | 12/1919 | Sweetland | 210—486 |
| 1,726,035 | 8/1929 | Loew | 210—347 X |

REUBEN FRIEDMAN, *Primary Examiner.*

D. M. RIESS, *Assistant Examiner.*